(12) United States Patent
Gleason

(10) Patent No.: US 11,730,270 B2
(45) Date of Patent: Aug. 22, 2023

(54) BACKREST

(71) Applicant: Richard Gleason, Tujunga, CA (US)

(72) Inventor: Richard Gleason, Tujunga, CA (US)

( * ) Notice: Subject to any disclaimer, the term of this patent is extended or adjusted under 35 U.S.C. 154(b) by 9 days.

(21) Appl. No.: 17/334,533

(22) Filed: May 28, 2021

(65) Prior Publication Data
US 2021/0368988 A1 Dec. 2, 2021

Related U.S. Application Data

(60) Provisional application No. 63/032,404, filed on May 29, 2020.

(51) Int. Cl.
| A47C 7/40 | (2006.01) |
| A47C 7/42 | (2006.01) |
| B60N 2/66 | (2006.01) |
| A61G 5/10 | (2006.01) |

(52) U.S. Cl.
CPC ............ *A47C 7/425* (2013.01); *A61G 5/1091* (2016.11); *B60N 2/66* (2013.01); *B60N 2/663* (2015.04)

(58) Field of Classification Search
CPC ...... A47C 7/425; A61G 5/1091; B60N 2/663; B60N 2/66
See application file for complete search history.

(56) References Cited

U.S. PATENT DOCUMENTS

| 4,753,482 A * | 6/1988 | Warren .................... A61G 5/00 5/653 |
| 4,835,801 A * | 6/1989 | Walpin .................. A47C 7/425 297/452.32 |
| 4,862,536 A * | 9/1989 | Pruit ........................ A47C 7/46 297/230.14 |
| D308,613 S | 6/1990 | Clark et al. |
| 5,248,182 A * | 9/1993 | Hittie ................... A61G 5/1091 297/452.32 |
| D342,857 S | 1/1994 | Mocur |
| D349,474 S | 8/1994 | Mocur |
| 5,692,246 A | 12/1997 | Benedick |
| 6,299,248 B1 * | 10/2001 | Gennaro ................. A47C 7/425 297/229 |
| 6,969,114 B2 * | 11/2005 | Keilhauer ................ B60N 2/66 297/452.34 |
| 7,651,163 B2 * | 1/2010 | Jaskot ..................... A47C 7/425 297/230.11 |
| 8,261,384 B2 | 9/2012 | Batiste et al. |
| 8,261,386 B2 * | 9/2012 | Kardos ................ A47C 20/027 5/639 |
| 8,596,717 B2 * | 12/2013 | Glyck .................... A47C 7/425 297/230.1 |

(Continued)

*Primary Examiner* — Syed A Islam

(57) ABSTRACT

A backrest having features that support proper sitting posture of a user to improve back health and posture may be utilized. The backrest may include a front wall with wings extending to the left and right and diagonally forward to reduce Kyphosis of a user when sitting against the backrest. A combination of the front wall and wings may causing the user's (i) back ribs to be raised and gently tilted forward and (ii) thoracic spine region to be gently thrusted forward. By thrusting the thoracic spine region and raising and tilting the back ribs, a user's abdominal cavity may be expanded, and thereby reinforcing the ideal positioning of the cervical spine so that the user's head naturally positions on axis and does not "dump" forward.

20 Claims, 10 Drawing Sheets

(56) References Cited

U.S. PATENT DOCUMENTS

| | | | |
|---|---|---|---|
| D790,255 S | 6/2017 | Mi | |
| D793,768 S * | 8/2017 | Goddard | |
| 9,999,304 B2 * | 6/2018 | Krishtul | A47C 7/46 |
| D853,152 S | 7/2019 | Chen | |
| D888,462 S | 6/2020 | Gang et al. | |
| D898,427 S | 10/2020 | Chen | |
| 10,869,556 B2 * | 12/2020 | Alletto, Jr. | A47G 9/1036 |
| 2009/0309399 A1 | 12/2009 | Liu | |
| 2019/0191900 A1 * | 6/2019 | Brown | A47G 9/0253 |

* cited by examiner

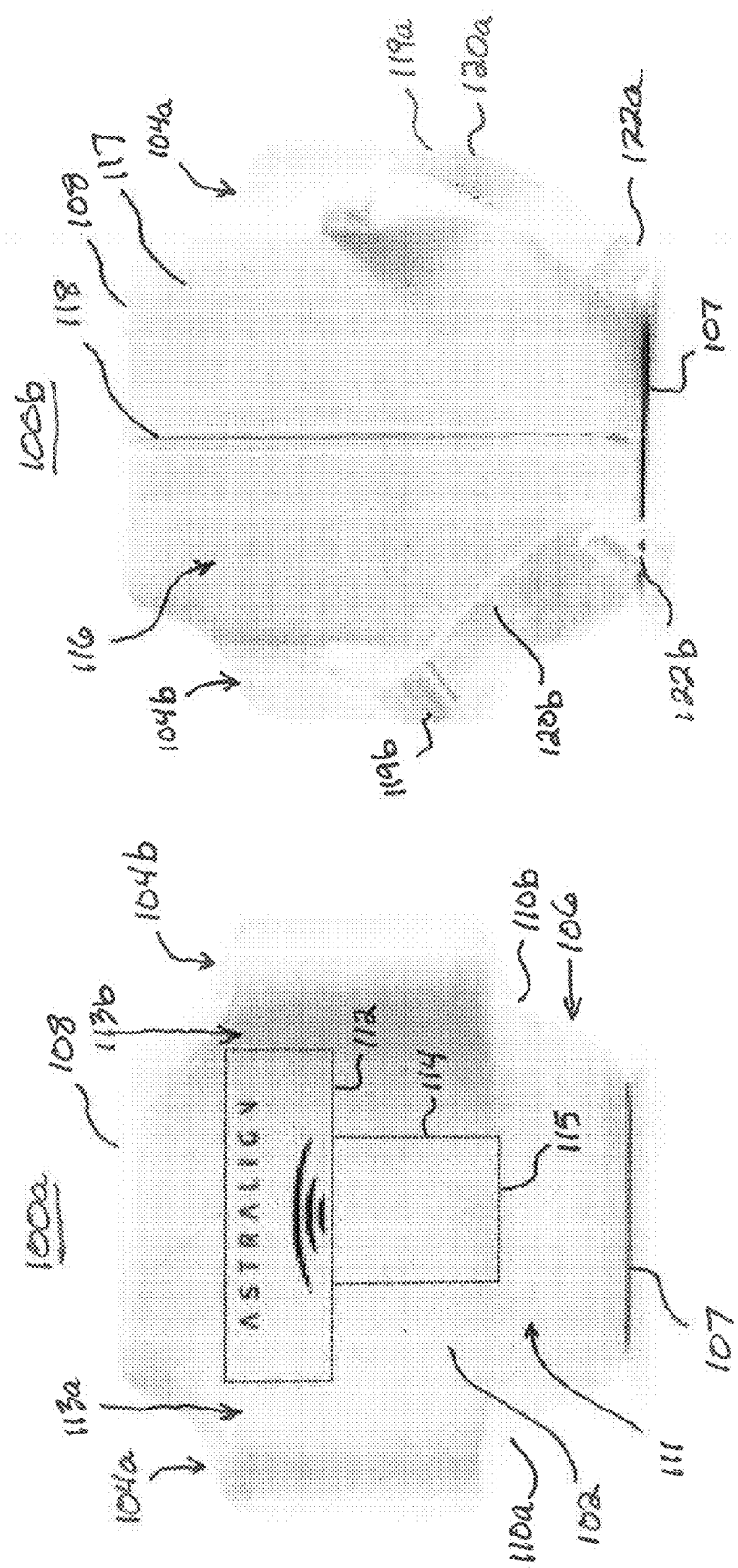

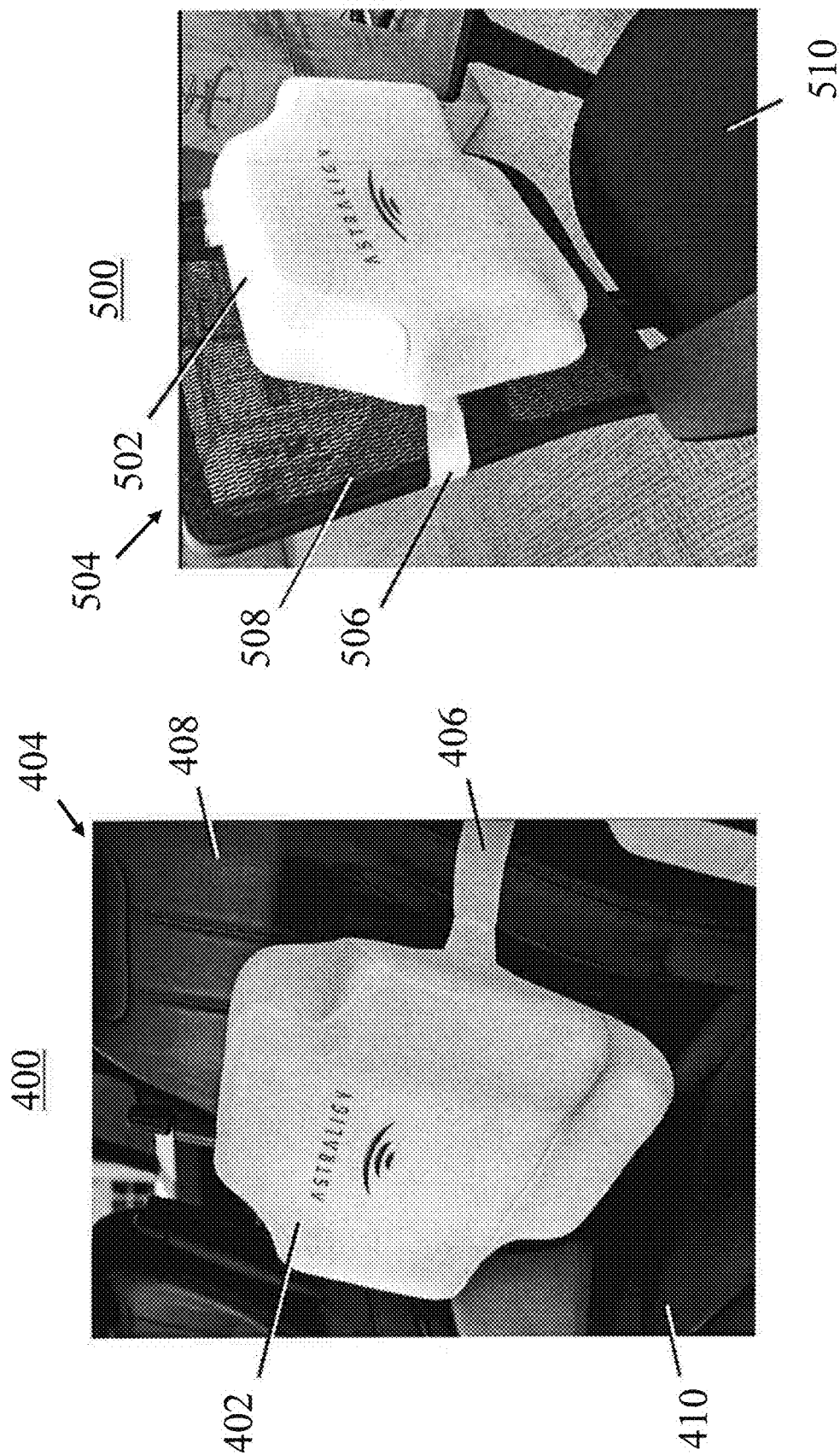

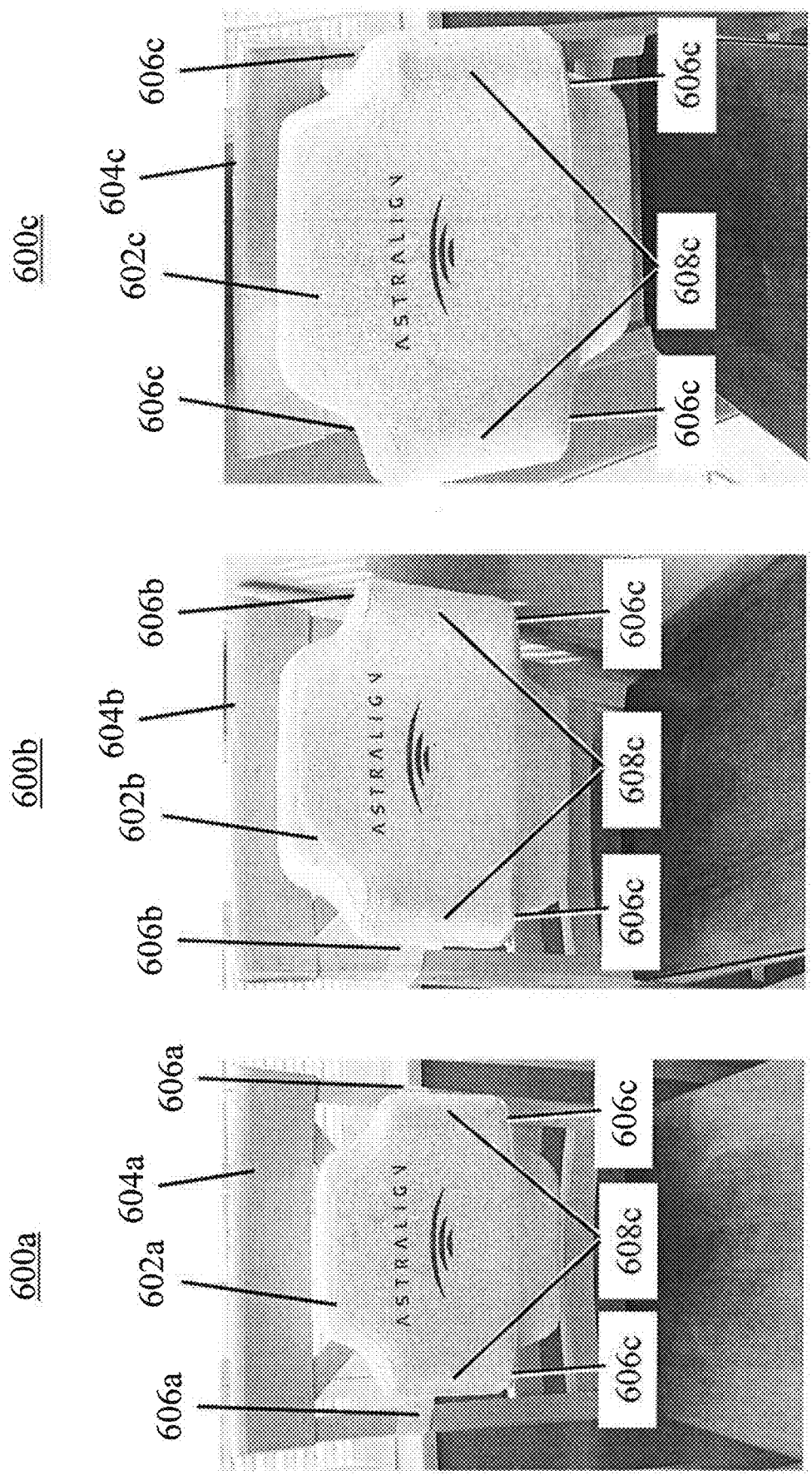

BACKREST

RELATED APPLICATIONS

This application claims priority to U.S. provisional patent application having Ser. No. 63/032,404 filed on May 29, 2020; the contents of which are herein by reference in their entirety.

BACKGROUND OF THE INVENTION

As a result of contemporary repetitive activities, such as driving, computer work, and smartphone usage, many people now have chronic shoulder/neck pain along with an exaggerated curve in the thoracic spine area (Kyphosis). Knowing that the trapezius muscle runs not just across the top of the shoulders, but down the thoracic spine, physical therapists and massage therapists perform treatments on loosening up the thoracic part of the trapezius muscle as well as the intercostal rib muscles attached to the thoracic vertebrae. Such treatments generally result in relieving shoulder and neck pain.

One reason for the chronic shoulder/neck pain includes incorrect thoracic positioning (Kyphosis). Causes for the incorrect thoracic positioning were:
  a) Atrophy through lack of use of 'binding' back muscles, such as the serratus Posterior superior,
  b) Forward head posture caused by contemporary demands of driving in cars, computer work, and Smartphone usage.

Most heads weigh 10-14 pounds—every inch your head moves off axis it gains and additional 10 lbs. of gravitational weight. Beyond the stress this puts on the neck and shoulder muscles, improper head positioning if unattended leads to degenerative changes in the spine. Also and perhaps in the long run most damaging is that kyphosis collapses the front (floating) ribs down into the abdominal cavity putting pressure on the heart and other internal organs and restricting the amount of room the diaphragm has to expand—thus restricting optimal oxygen infusion into to the body.

Forward-head posture and thoracic curvature (Kyphosis) tend to cause 'positional muscles' to be enlisted to do the work of 'weight bearing muscles' in order to compensate, which leads to muscle exhaustion. There are body positional solutions to regain proper thoracic extension (flexion) and reposition the thoracic spine so the head may be put back 'on axis' or close to it. However, even after people are advised and coached on how to fire the muscles involved in thoracic extension in their active lives, when they are involved in passive activities, such as driving, computer, or cell phone use, the people typically 'forget' and revert to a curved thoracic position.

In some cases, posture correcting contraptions, such as harnesses and buzzers, may be worn, but users invariably stop using them after a while for a variety of reasons, including, but not limited to, people do not like to wear corrective gear. What is needed to help solve the problem of chronic shoulder and neck pain is a device that people can use to correct their positioning, but is not worn so that users use the devices for a more prolonged period of time to receive the physical benefits therefrom.

SUMMARY

To properly align a user's posture while sitting, a backrest having features that support proper sitting posture of a user to improve back health and posture may be utilized. The backrest may include a front wall with wings extending to the left and right and diagonally forward to reduce Kyphosis of a user when sitting against the backrest. A combination of the front wall and wings may causing the user's (i) back ribs to be raised and gently tilted forward and (ii) thoracic spine region to be gently thrusted forward. By thrusting the thoracic spine region and raising and tilting the back ribs, a user's abdominal cavity may be expanded, and thus reinforcing ideal positioning of the cervical spine so that the user's head naturally positions on axis and does not "dump" forward.

One embodiment of a backrest may include a main body including a front wall for a back of a user to press when sitting and a rear wall that presses against a seatback, and wings connected to the main body and extending from the left, right, and diagonally forward to the outside of the front wall of the main body. The main body may be configured to provide support for and push forward an area between the scapulae, upper thoracic region, and lower thoracic region of a spine of a user when the user sits with his or her bottom ribs aligned with a bottom edge of the wings. The wings may complement the action of the main body by providing additional support to provide forward and upward thrust to the back ribs of the user. Also, when used in a vehicle, reduced body motion occurs when cornering.

BRIEF DESCRIPTION OF THE FIGURES

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1A-1D are illustrations of an illustrative backrest having features that support proper sitting posture of a user to improve back health and posture;

FIG. 4 is an image of an illustrative backrest positioned on a seat of a vehicle;

FIG. 5 is an image of an illustrative backrest positioned on a seat of an office chair;

FIGS. 6A-6C are images of small, medium, and large illustrative backrests attached to respective chairs;

DETAILED DESCRIPTION OF THE INVENTION

Figure 1D:
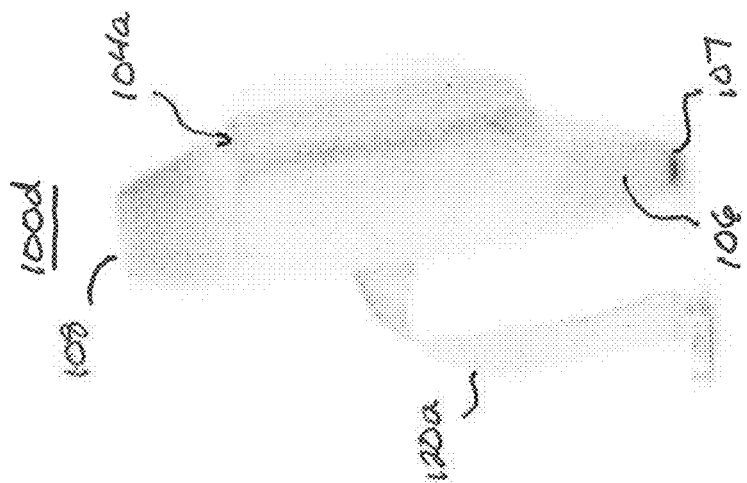

To help users reduce chronic shoulder and neck pain, a body positioning cushion or backrest for use with a seat of a vehicle, chair (e.g., office or dinner chair), airplane seat, or couch when watching TV or propped up in bed reading that would compel users into proper thoracic extension may be utilized. Each of these activities are activities in which users sit for longer periods of time such that using the body positioning backrest helps to reduce developing shoulder/ neck/back discomfort, and thereby lowering the risk of degenerative physical phenomena, such as atrophy of 'binding' back muscles and forward head posture.

In an embodiment, a dedicated Thoracic adjustment support backrest may be provided for users to use in the different activities. Back bolsters have historically been used for either supine use (laying down) to elongate the Cervical spine or, if for upright application, focused entirely on supporting the lumbar or lower portion of a spine. Lumbar supports have been integrated into automobile seats, where lumbar adjustment mechanisms have become fairly standard. While lumbar support mechanisms may provide comfort for a while, the lumbar supports do not and will not solve the actual current epidemic posture problem of Kyphosis (i.e., excessive forward rounding of the upper back). In some cases, bolsters may actually promote Kyphosis.

With regard to the contemporary posture crisis, in most cases the lumbar achieves a nice lordotic curve naturally and does not need bolstering if the thoracic spine and floating ribs are supported by either muscle engagement (Intertransversarii Thoracis, Semispinalis Thoracis, Serratus Superiur, etc.) or the application of a bolster to the thoracic spine and surrounding ribs to provide a gentle amount of forward and upward thrust. When Kyphosis is eliminated, or at least reduced, the cervical spine no longer 'dumps' forward, thus repositioning the head, thereby allowing the user's head to sit on axis at the top of the spine with eyes of the user oriented along a horizontal plane.

Backrest

A backrest may be configured to reduce Kyphosis of a user when sitting against the backrest by causing the user's (i) back ribs to be raised and gently tilted forward and (ii) thoracic spine region to be gently thrusted forward. By thrusting the thoracic spine region and raising and tilting the back ribs, a user's abdominal cavity may be expanded, thus alleviating pressure on the internal organs and allowing for greater expansion of the diaphragm for greater ease in breathing. A related effect to thrusting forward the thoracic spine is reinforcing the ideal positioning of the cervical spine for the user so that the user's head naturally positions on axis and does not "dump" forward. In configuring the backrest, shape and material of the backrest may provide for (i) pushing forward the thoracic spine and (ii) raising and tilting the back ribs of a user when the user sits and his or her back presses against the backrest.

In general, a "Thoracic Thrust" effect may be accomplished by using a foam (or other material) shaped in the form of a backrest that (i) supports various portions of the back and (ii) raises and tilts the back ribs. To create the backrest, a single foam block may be cut with certain features, thicknesses, and angles, in an embodiment. In an alternative embodiment, multiple layers of shaped and/or cut foam may start flat, stacked or otherwise arranged with respect to one another, folded, and glued or otherwise attached. In either case, the foam may have certain parameters so that the backrest provides proper support for a user, as further described herein. Moreover, because users are of different sizes, the backrest may be configured in different sizes, such as small, medium, and large. The different sizes may have the same shape, but the dimensions may be scaled, as further described herein.

With regard to FIGS. 1A-1D, illustrations of a backrest 100a-100d (collectively 100) having features that support proper sitting posture of a user to improve back health and posture are shown at different respective angles. The backrest 100 includes a main body 101 having a front wall 102. To the sides of the front wall 102, a right wing 104a and left wing 104b (collectively 104) are extended sideways and slightly forward. The bottom portion 106 is recessed and extends beneath the front wall 102 to a bottom wall 107. The backrest 100 extends from the bottom wall 107 and upward to a top wall 108. Beneath the wings 104, transition curves 110a-110b (collectively 110) are concave and extend into the bottom portion 106. The transition curves 110 enable the backrest 100 be strapped to a car seat and avoid lower battens that are typical of higher-end car seats that are meant to maintain a driver's position when turning the car. The transition curves 110 also provide an smooth ornamental appearance.

An upper thoracic booster region 112 and a lower thoracic booster region 114 are shown in dashed lines on the wall 102. These regions 114 show where a user is to align his or her upper thoracic lower thoracic portions of the user's spine when pressed against the backrest 100. A bottom line 115 on the lower thoracic booster region 114, which in this case corresponds with the lower edge of the ribs 104, is meant to be positioned against bottom ribs of the user when in use such that the backrest 100 is properly positioned to help improve the user's posture. From the bottom line 115 to the lower portion 106, the back rest 100 has a smooth, sloped transition or spline curve shape region 111 so as to be more comfortable for a user than if the transition from the front wall 102 were more abrupt. Moreover, the region 111 has a smooth ornamental appearance for a user. Similarly, the transition curve regions 113a and 113b from the front wall to each of the right and left wings 104 may be smooth transitions or splines to be more comfortable user and you have a nicer ornamental appearance.

As shown in FIG. 1B, a back wall 116 extends the height of the backrest 100. The backrest 100 is shown in a completed state, and includes a cover 117 that includes a zipper 118, which extends from near the bottom wall 107 to near the top wall 108 of the backrest 100. The cut foam (not shown) is inserted into the cover such that a snug fit of the cover against the foam is made to prevent or minimize wrinkles due to a gap or misalignment between the foam insert and cover 117. As further shown, the cover 117 may include a right strap 120a and left strap 120b (collectively 120) that include connectors 122a and 122b (collectively 122), respectively, that are configured to be engaged and secure to one another. To enable the straps 120 to be strapped to a wide variety of chairs, strap adjustment members 119a and 119b (collectively 119) may be utilized to enable the straps 120 to be lengthened and shortened by the user. It should be understood that the shapes of the straps 120 and configuration of the connectors 122 and adjustment members 119 are illustrative, and that a wide range of shapes, thicknesses, and types may be utilized to provide the same or similar function of enabling the backrest 100 to be strapped and secured to a chair or seat of a vehicle (see, for example, FIGS. 3-5C) for proper alignment for the user.

Figure 1C:
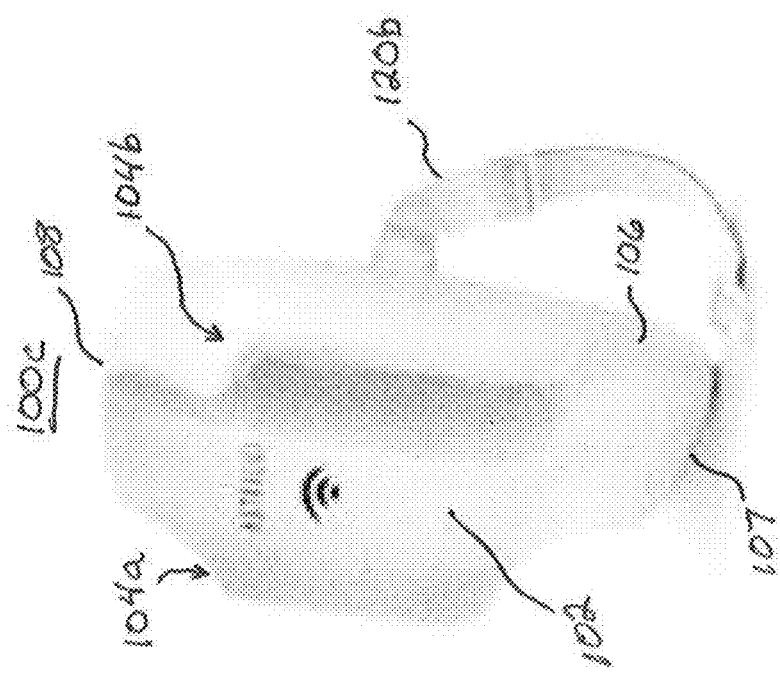

With regard to FIGS. 1C and 1D, a left-side perspective view and a right-side view are respectively shown. From the two views, it may be seen that the wings 104 extend forward of a vertical plane extending along the front wall 102. It may also be seen that the bottom portion is positioned behind the vertical plane of the front wall 102. By having the bottom portion 106b recessed from the front wall 102, a user's gluteus maximus may be positioned behind his or her rib cage when properly sitting with the back against the front wall 102, thereby stopping the front wall 102 from applying any pressure at or near the kidneys of the user and enabling the front wall 102 to properly support the lower thoracic portion of the user's spine so as to gently raise and tilt the back ribs.

In operation, when a user straps or removably attaches the backrest 100 to a seat or chair and rests his or her back against the front wall 102 of the main body 101 of the backrest 100 with his or her lowest ribs at the bottom line 115 of the lower thoracic booster region 114 as previously described, the upper thoracic booster region 112 of the front wall 102 may support and thrust or push forward the upper thoracic region (vertebrae T6-T2) and space between the scapula of the user. The lower thoracic booster region 114 may support and thrust or push forward the lower thoracic region (vertebrae T12-T6) of the user. The upper thoracic booster region 112 is meant to 'grab' the area between the scapulae and boost or push the area between the scapulae forward, while the lower thoracic booster region is aligned along a vertical axis to boost the vertebrae T12-T6 without incursion on the renal platform (e.g., kidneys). In essence, proper usage of the backrest 102 may help to alleviate or reduce muscle stress or fatigue on the kidneys.

The wings 104 may accomplish the functions of:
  (i) coddling a user in a light embrace so as to keep the user centered on the backrest and in proper alignment therewith;
  (ii) mitigating G-forces during cornering (when used on a car seat);
  (iii) catching the back ribs in a wrapped embrace and push the ribs slightly up and forward to help the spine;
  (iv) providing weight dispersal to mitigate user fatigue (so the user's back does not get tired of resting on the device); and
  (v) inclusion of the wings 104 may reduce muscle fatigue to the longissimus thoracis muscle and other muscles along the spine. Stated another way, without the wings 104, muscle fatigue of the longissimus thoracis and other muscles along the spin occurs.

The foam insert material may have certain characteristics that provide for proper support and durability. In one embodiment, polyurethane foam with a density of between approximately 1.7 pounds per cubic-foot and approximately 1.9 pounds per cubic-foot and an indentation force deflection (IFD) or sometimes known as indentation load deflection (ILD) in the range from approximately 41 to approximately 49, where being "approximately" means that the end points of the range may vary by a few percent, such as five percent. In an embodiment, the foam may have a density of 180 and an IFD of 45 for thicknesses provided herein with regard to FIGS. 2A-2C.

Other thicknesses, density, and deflection that provides for the same so similar function may alternatively be used. A support factor (65%/25%) may be about 1.9, but other factors may be utilized. Tensile strength may be about 13 psi, but other tensile strengths may be utilized. Resiliency may be about 35%, but other resiliency percentages may be utilized. To determine an appropriate foam density, ILD, and weight, much experimentation was performed to establish a proper ratio of support and comfort. Establishing the right thickness for the foam was tested to establish proper 'thoracic thrust.' The thickness, density, and deflection of the foam (or other material) may be the same or different for different height, size, and/or weight of users. For example, a heavier and taller user may use a backrest formed of different material with parameters that are different than those for a lighter and shorter user.

By using foam, the backrest 100 may be light and flexible. It should be understood that alternative materials may be utilized. The cover 117 may be a fabric, and have a mesh or any other pattern. The cover 117 may alternatively be formed of leather or a synthetic material, but be pliable such that the foam insert is capable causing the cover 117 to avoid having creases or lumps, for example, and to perform the support functions described herein.

In an alternative embodiment, an inflatable plastic version may be formed to have the same or similar shape as shown in FIG. 1. In an embodiment, an adjustable feature or structure formed of an air bladder or other structure may be used (i) to fine tune an amount of lift to a user's thoracic spine and (ii) to fine tune the amount of curvature to the wings 104. The amount of air pressure should provide a similar amount of support as the foam with density, ILD, and other parameters, as described hereinabove.

Figure 2B:
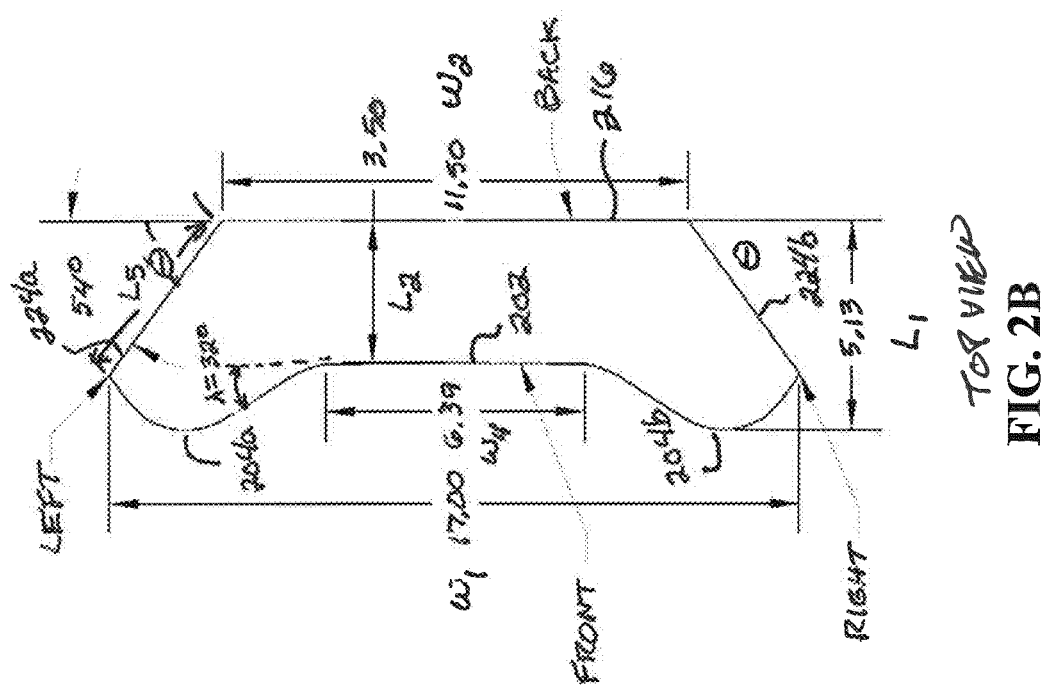
FIGS. 2A-2C are illustrations of an illustrative backrest showing illustrative dimensions to support proper sitting posture of a user to improve back health.
Figure 2A:
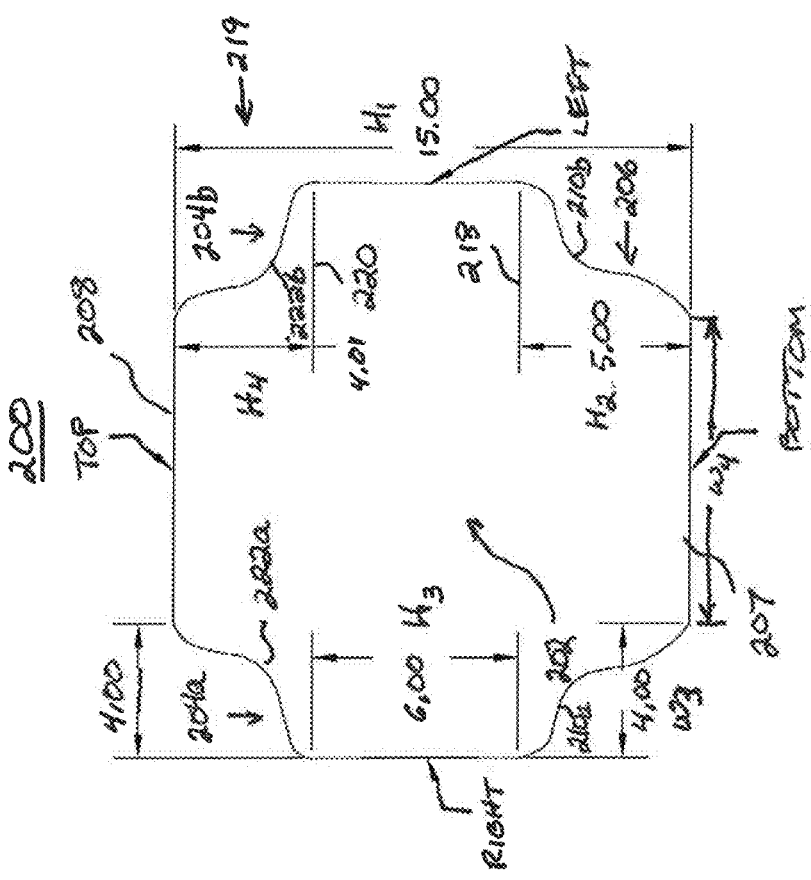
Figure 2C:
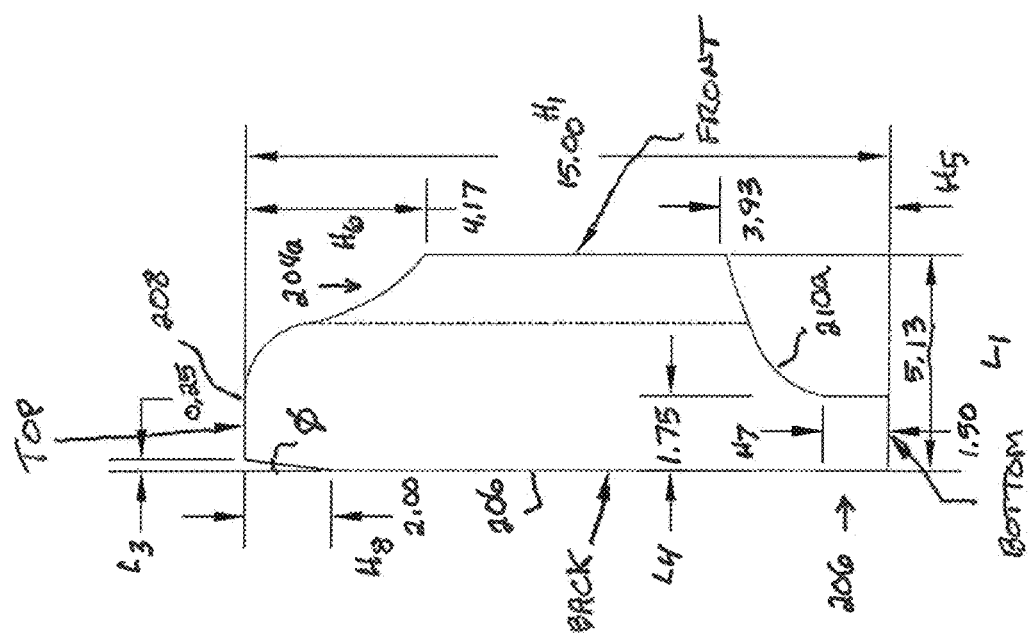
Figure 3B:
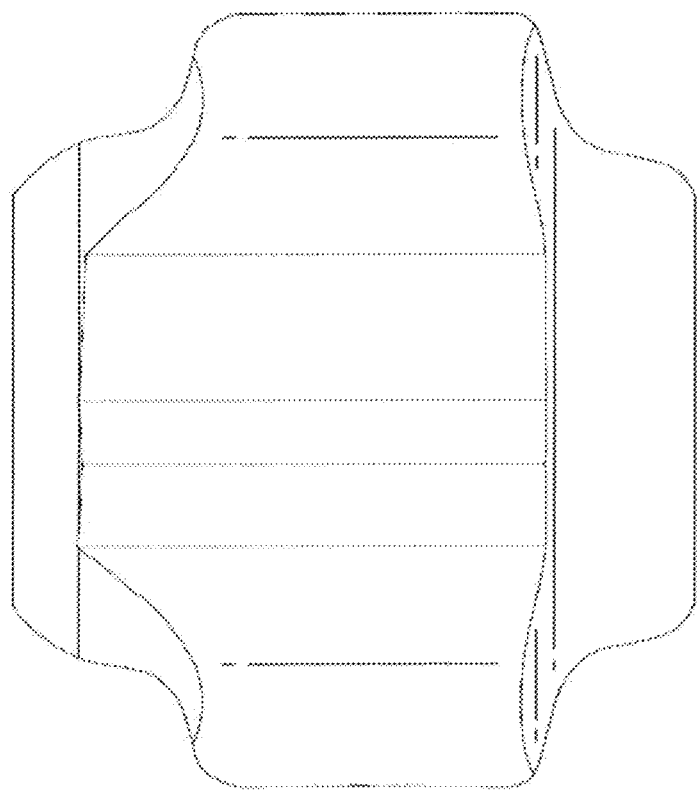
FIGS. 3A-3G are illustrations of an illustrative foam insert of a backrest shown at different angles, which, when covered with a backrest cover, has the same shape as the foam insert.
Figure 3A:
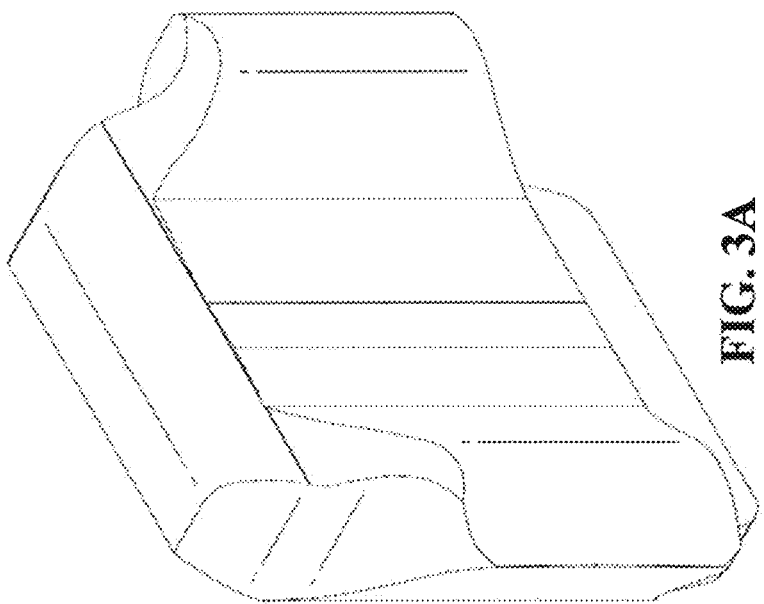
Figure 3E:
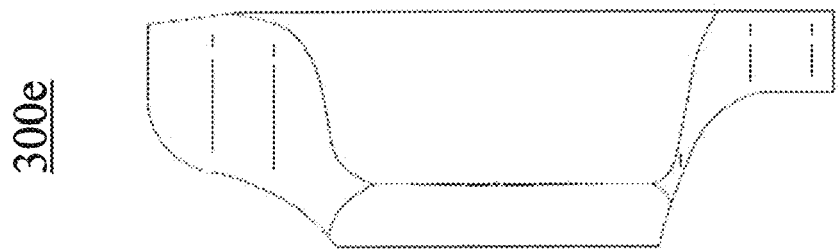
Figure 3D:
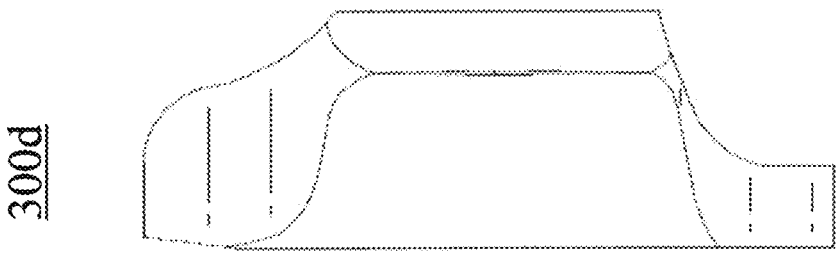
Figure 3C:
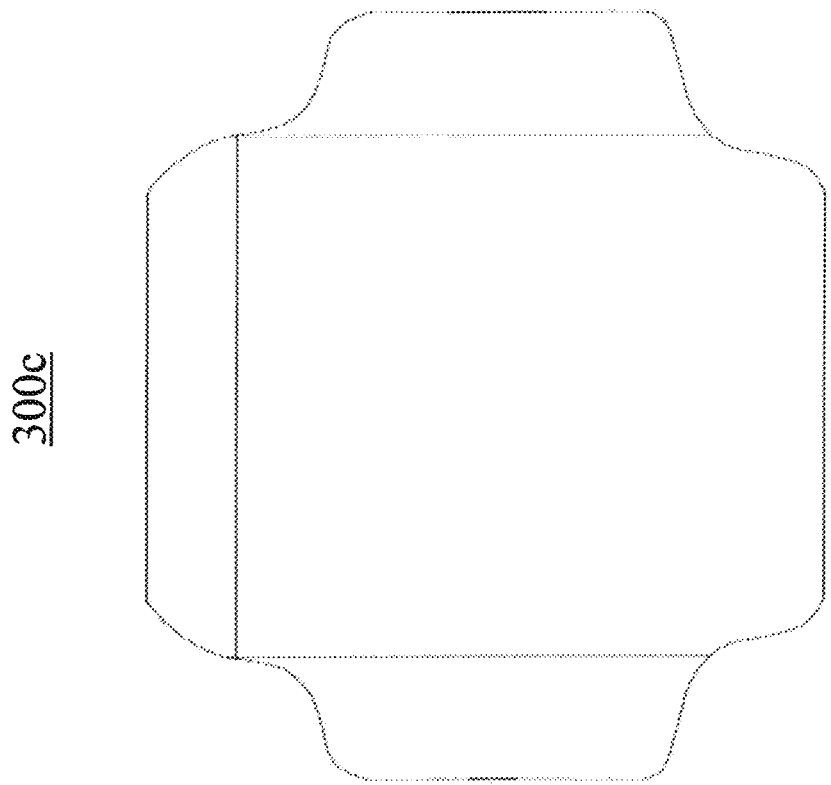
Figure 3F:
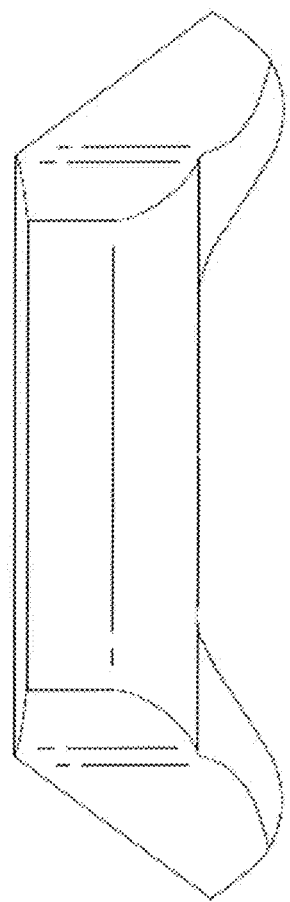
Figure 3G:
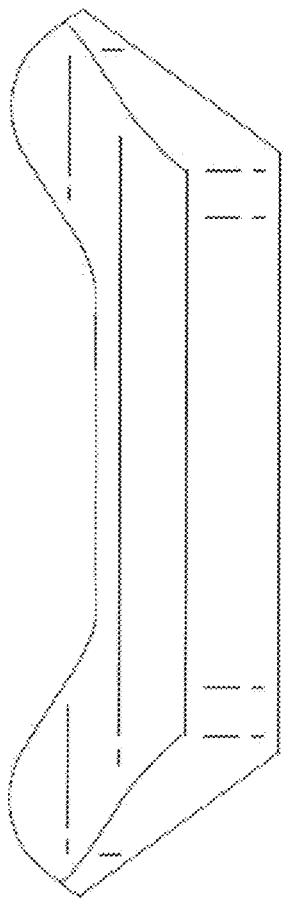

With regard to FIGS. 2A-2C, illustrations of a backrest 200 with illustrative dimensions to support proper sitting posture of a user to improve back health are shown. As shown in FIG. 2A, the backrest 200 may have an overall height H1 extending from a bottom wall 207 to top wall 208. A front wall 202 may have a height 112, and be defined by a region extending from above a bottom portion 206 at a horizontal plane 218 and below a top region or section 219 above a horizontal plane 220. The horizontal planes 218 and 220 start where the wings 204 are defined by vertical outside edges (i.e., left and right-most sidewalls of the backrest 220). The top section 219 above the horizontal plane 220 may have a height of 114. The bottom section 206 may be defined by convex curves 210a and 210b on right and left sides, which, as previously described, prevent pressure from being applied to kidneys or muscles thereat of a user. For symmetry purposes, the top section may have common convex curves 222a and 222b as curves 210a and 210b.

With regard to FIG. 2B, the backrest 200 may have a main body 201 including a front wall 202 with a width W4 extending between inside edges of wings 204a and 204b (collectively 204) that define a total width of W1 of the backrest 200 extending between left and right end-points. Each of the wings 204 may have a common width W3 (FIG. 2A). A back wall 216 may have an overall width of W2 (FIG. 2B). The overall length L1 of the backrest 200 is from the back wall 216 to the most farthest point of the wings 204. Outside walls 224a and 224b may be at an acute angle of 0 degrees from the back wall 216. Although the outside walls 224 are shown to be straight, it should be understood that curved walls may also be utilized. The length or thickness of the main body 201 of the backrest 200 (i.e., between the front wall 202 and the back wall 216) is L2. A top portion of the back wall 216 may be angled at an angle φ towards the front wall 202 with a distance of L3. As shown in FIG. 2C, a height 115 may extend beneath the wings 204 and bottom wall 207, and a height 116 extending between a top of the wings 204 and top wall 208. The bottom section 206 may have a length L4 and a height 117, where the bottom section is shown to start when the sidewalls of the bottom section are parallel with one another. As shown the length of the bottom portion 206 is much shorter than the length L1 of the backrest 200 and is shorter than the length L2 from the back wall 216 and front wall 202.

In an illustrative embodiment, the lengths (in inches) may be as follows: L1=5.13, L2=3.5, L3=0.25, L4=1.75, and L5=4.68; the widths (in inches) may be as follows: W1=17.00, W2=11.50, W3=4.00, and W4=9.00; the heights (in inches) may be as follows: 111=15.00, 112=5.00, 113=6.00, 114=4.01, 115=3.93, 116=4.17, and 117=1.50; the angles φ=13 degrees, Θ=54 degrees, and λ=32 degrees. In an embodiment, the curves 210a, 210b, 222a, and 222b may each have a radius of 1.05. The values provided here are illustrative, and it should be understood that alternative dimensions and/or configurations may be utilized. For example, rather than Θ being at 54 degrees, Θ could be anywhere between about 49 and about 60 degrees. Similarly, rather than λ being at 32 degrees, could be anywhere between 28 and 36 degrees. Because the material is foam, it should be understood that the angles and dimensions could appropriately vary as a result of flexibility and acceptable tolerances of foam and fabric manufacturing.

With regard to FIGS. 3A-3G, illustrations of an illustrative foam insert 300a-300g (collectively 300) of a backrest shown at different angles, which, when covered with a backrest cover, has the same shape as the foam insert 300 are shown. The angles shown include perspective, front, back, right, left, top, and bottom.

With regard to FIG. 4, an image of an environment 400 in which a backrest 402 positioned on a seat 404 of a vehicle is shown. The backrest 402 is shown with straps 406 being connected around a seatback 408 of the seat 404 to secure or releasably attached the backrest 402 to the seat 404. The backrest 402 may be secured at a height H above a seat bottom 410 of the seat 404 such that a bottom edge 412 of wings 414 (and a front wall 416 in this embodiment) of the backrest 402 aligns with bottom ribs of a user when seated on the seat bottom 410 so as to thrust the lower thoracic spine forward, as previously described.

In an alternative embodiment, the backrest 402 may be configured with an adjustable bottom portion capable of extending downwards and upwards so that the user may set a height of the backrest by using the adjustable bottom portion. In another embodiment, rather than using straps, the backrest may be configured with or be capable of connecting to a vertical bracket or structure that is able to push into a slot between the seat bottom and seatback on the bottom end of the bracket and extend over and secure to the top of the seat or chair. It should be understood that a wide variety of configurations for setting height of the backrest with respect to the seat or chair to which the backrest is being mounted may be utilized to minimize or reduce installation and installation time.

With regard to FIG. 5 is an image of an illustrative scene 500 in which a backrest 502 is positioned on an office chair 504. The backrest 502 is connected to the office chair 504 with the strap 506 being wrapped around the seatback 508 of the office chair 504. As with the backrest 402 of FIG. 4 being positioned at a height H above the seat bottom 410 of the seat 404 in the vehicle, the backrest 502 may also positioned at a height H above a seat bottom 510 of the office chair 504 for the same individual. It should be understood that individuals with different torso lengths or other body shapes may position the backrest at different heights. It should also be understood that if one seat bottom type (e.g., cushion) is softer than another seat bottom (e.g., wood or metal).

The cover may be snug so as to minimize wrinkles. The cover may be formed of a flame retardant material that is washable. In an embodiment, the material may be germ resistant. It should be understood that additional and/or alternative arrangements of the components may be utilized to produce a backrest that performs the same or similar functionality as described herein.

When the backrest is used in a car seat, depending on a specific design of a car seat, side battens of a car seat provide amount of forward push to wings of the backrest. As the wings may be pushed forward when a user presses against a front wall of the backrest, the wings may move the back ribs of the user forward in about the same ratio as the boost to the upper and lower spine portions by the main body so as to push the thoracic spine forward. The wings provide a nice 'huggy' feel. In some cases, office chairs, couches, and other non-car seat seating devices have battens of a car seat, so the backrest with the wings operate in the same or similar manner as when used in a car seat. However, it should be understood that the wings of the backrest are stiff enough to operate independent of battens of a car seat or any other seat. In an embodiment, one or more foam or non-foam structural features may be placed behind the backrest and/or wings to replicate the support of batons of a car seat. The structural feature(s) may adjust the amount that the wings push forward to create a tightness of the wings around the user's back ribs.

With regard to FIGS. 6A-6C, scenes 600a-600c of small, medium, and large illustrative backrests 602a-602c (collectively 602) attached to respective chairs 604a-604c (collectively 604) are shown. The different size backrests 602 may be positioned at different heights for different size individuals. As previously described, the backrest 602 may have straps 606 that extend around the sides of the chairs 604, but alternative configurations of straps (e.g., vertical), clamps, brackets that hold or extend over the top of a chair, or any other type of flexible or rigid elements that may secure the backrests 602 to the chairs 604 may be utilized. In an embodiment, a flexible measurement element (e.g., fabric with a certain length) (not shown) may be attached to a cover of the backrests 602 to help the user measure a height at which the backrests 602 may be positioned for faster installation (i.e., to reduce the number of adjustments to align the backrest 602 to the lower ribs of the user, as previously described). As previously described, the bottom edges 606a-606c of wings 608a-608c of the respective backrests 502 are to be aligned with the lowest ribs of the users when removably attached to the chairs 504. Also, while inclusion of a cover for the backrests 602, it is possible to use the foam inserts independent of covers.

In an embodiment, the small, medium, and large backrests 602 may be scaled versions of one another. The scaling may be performed by using teenagers and small adults, adult female, and adult male sizes as provided by a governmental or medical organization, such as those provided by U.S. Army. Each of the dimensions, lengths, widths, and thicknesses may be scaled. Other techniques for establishing dimensions for the different sizes of the backrests 602 may be used. Moreover, other size backrests may be provided for different size users (e.g., extra-large, extra small). It should be understood that alternative numbers of sizes may be made, as well, including customized versions based on measurements on an individual for whom the customized backrest is to be produced.

Although the backrest has been described as a stand-alone device, it should be understood that features, either the same or analogous, may be built into furniture or other seats. For example, chairs may be created that includes (i) a cushion configured to boost upper and lower thoracic spine regions and (ii) wings that complement the function of the cushion. In an embodiment, the wings may be reticulated with reticulating arms formed of rigid material (e.g., metal, plastic, or otherwise) positioned within or behind the foam such that a user may rotate the wings to be in a desired position. In another embodiment, a structure within or behind the wings in the backrest or furniture may have joints that may be rotated and locked by a locking mechanism (e.g., screw, knob, pin, etc.), thereby being custom adjusted by a user. In an embodiment, the wings may be rotatable upwards and downwards so that a user may sit down and then pull the wings into position. In an alternative embodiment, the wings may be rotatable outwards and inwards. Still yet, the wings may be extendable and retractable. For any of the movement of the wings, an internal or external structure that supports such movement may be provided to support the positioning and repositioning of the foam or other material used to form the wings.

As previously described, rather than using foam, a balloon or inflatable design may be configured with the same or similar shape and dimensions to provide the same or similar functionality as the backrests previously presented. By using an inflatable design, a user may more easily travel with the inflatable backrest when deflated. The volume and amount of pressure needed to inflate the inflatable backrest may be low enough such that a user may inflate the inflatable backrest by him or herself by blowing into the inflatable backrest via a value (e.g., intake valve for an inflatable ball or pool toy) without the aid of a pump.

Figure 7:
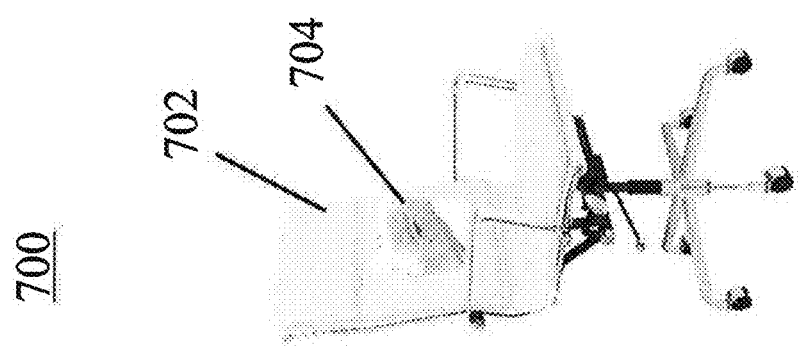
FIG. 7 is an illustration of an illustrative office chair having a chair back cushion with a backrest integrated therewith.

With regard to FIG. 7, an illustration of an illustrative office chair 700 having a chair back cushion 702 with a backrest 704 integrated therewith is shown. The backrest 704 may be integrated as an original equipment manufacturer (OEM) or be an aftermarket cushion configured to fit the chair 700. The back cushion 702 may be configured with a vertical adjustment such that wings of the backrest 704 may be aligned with the bottom ribs of a user.

Figure 8:
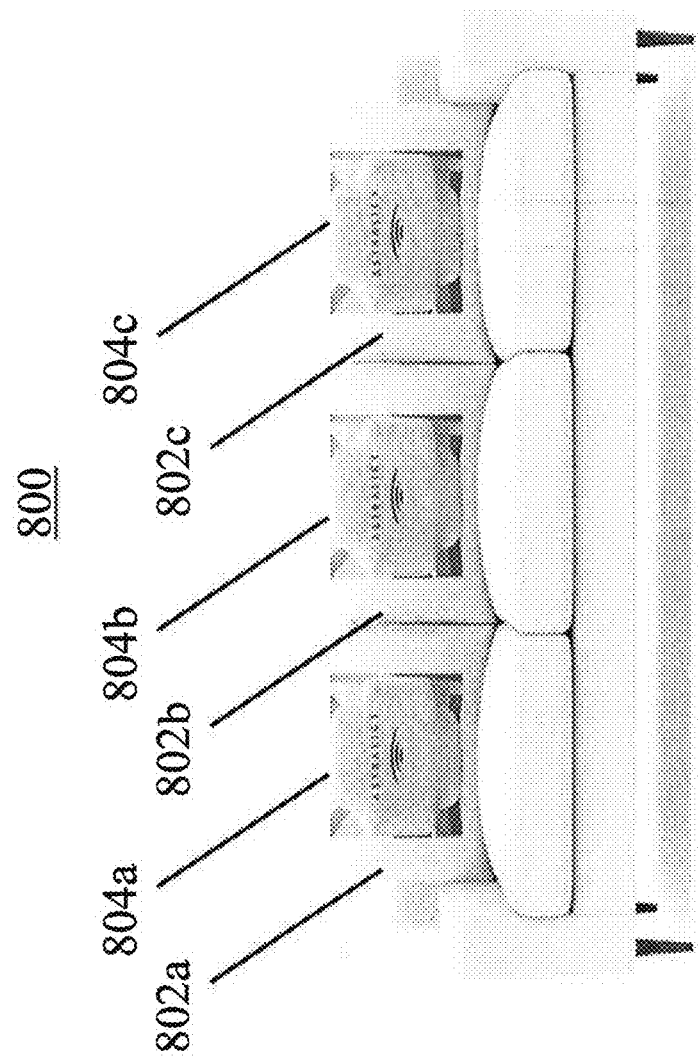
FIG. 8 is an illustration of an illustrative couch having cushions with a backrest integrated therewith.

FIG. 8 is an illustration of an illustrative couch 800 having cushions 802a-802c (collectively 802) with backrests 804a-804c (collectively 804) integrated therewith. The cushions 802 may be integrated as an original equipment manufacturer (OEM) or be an aftermarket cushion configured to fit the couch 800. It should be understood that a backrest may be integrated into other types of seats or cushions, such as a car seat, airplane seat, train seat, movie theater seat, or any other seat. If integrated into a seat, backrest and or cushion into which the backrest is integrated may be configured to be vertically adjusted such that the backrest may be aligned with the bottom ribs of a user.

A method of manufacturing may be utilized to produce a backrest as shown and described herein. The backrest may be formed from a single block of foam and a saw, such as a wire saw, or any other type of cutting tool may be utilized to form the shaped foam. In an alternative embodiment, a mold with inside wall(s) with the profile of the shape of the backrest may be created in which foam is sprayed and cured to produce the backrest. Any other manufacturing technique to produce the backrest may be utilized.

While various aspects and embodiments have been disclosed, other aspects and embodiments are contemplated. The various aspects and embodiments disclosed are for purposes of illustration and are not intended to be limiting, with the true scope and spirit being indicated by the following claims.

I claim:

1. A backrest, comprising:
    a main body including a front wall and defining an upper thoracic region and a lower thoracic region, the front wall being configured for a back of a user to press when sitting and a rear wall that presses against a seatback; and
    wings connected to the main body and horizontally positioned between the upper and lower thoracic regions defined by the main body, the wings further extending from the left, right, and diagonally forward to the outside of the front wall of the main body, the main body configured to provide support for and push forward an area between the scapulae, upper thoracic region, and lower thoracic region of a spine of a user when the user sits with his or her bottom ribs aligned with a bottom edge of the wings, the wings complementing the action of the main body by providing additional support to provide forward and upward thrust to the back ribs of the user.

2. The backrest according to claim 1, further comprising a lower region that extends downward from the main body and is thinner than the main body, a rear wall of the lower region extending coplanar from a rear wall of the main body such that a front wall of the lower region is disposed behind a vertical plane along the front wall of the main body.

3. The backrest according to claim 2, wherein the lower region has a width that is narrower than a width of the main body.

4. The backrest according to claim 3, wherein the main body transitions to the lower region with splines that symmetrically and respectively curve inward from side walls of the main body.

5. The backrest according to claim 4, further comprising a top region that extends upwards from the main body and has a top wall with a width that is narrower than a width of the main body.

6. The backrest according to claim 5, wherein the main body transitions to the top region with splines that symmetrically and respectively curve inward from side walls of the main body.

7. The backrest according to claim 6, wherein a back wall of the top region is angled forward from a plane extending vertically along a back wall of the main body.

8. The backrest according to claim 1, wherein an angle of the diagonal of back walls of the wings is about 54 degrees relative to a plane extending along a back wall of the main body.

9. The backrest according to claim 1, wherein the wings have a front wall with an angle of about 32 degrees forward of a plane that defines the front wall of the main body.

10. The backrest according to claim 1, wherein the main body and wings are formed from a single piece of foam.

11. The backrest according to claim 10, further comprising a cover that covers the foam and includes a left strap and a right strap connected to the cover, and configured to removably connect the backrest to a chair or seat.

12. A method of manufacturing a backrest, comprising:
    forming a main body from a block of foam, the main body including a front wall and defining an upper thoracic region and a lower thoracic region, the front wall being configured for a back of a user to press when sitting and a rear wall that presses against a seatback; and
    forming, from the block of foam, wings connected to the main body and horizontally positioned between the upper and lower thoracic regions defined by the main body, the wings further extending from the left, right, and diagonally forward to the outside of the front wall of the main body, the main body configured to provide support for and push forward an area between the scapulae, upper thoracic region, and lower thoracic region of a spine of a user when the user sits with his or her bottom ribs aligned with a bottom edge of the wings, the wings complementing the action of the main body by providing additional support to provide forward and upward thrust to the back ribs of the user.

13. The method according to claim 12, further comprising forming a lower region that extends downward from the main body and is thinner than the main body, a rear wall of the lower region extending coplanar from a rear wall of the main body such that a front wall of the lower region is disposed behind a vertical plane along the front wall of the main body.

14. The method according to claim 13, wherein forming a lower region includes forming a lower region that has a width that is narrower than a width of the main body.

15. The method according to claim 14, wherein forming the lower region further includes forming a transition from the main body to the lower region with splines that symmetrically and respectively curve inward from side walls of the main body.

16. The method according to claim 15, further comprising forming a top region that extends upwards from the main body and has a top wall with a width that is narrower than a width of the main body, and further comprising forming the main body with transitions to the top region with splines that symmetrically and respectively curve inward from side walls of the main body.

17. The method according to claim 16, wherein forming the top region includes forming a back wall angled forward from a plane extending vertically along a back wall of the main body.

18. The backrest according to claim 12, wherein forming wings includes forming an angle of the diagonal of the wings to be about 54 degrees relative to a plane extending along a back wall of the main body.

19. The backrest according to claim 12, wherein forming wings includes forming wings that have a front wall with an angle of about 32 degrees forward of a plane that defines the front wall of the main body.

20. The backrest according to claim 12, further comprising attaching a left strap and a right strap to a cover that fits over the formed foam, the straps configured to removably connect the backrest to a chair or seat.

* * * * *